United States Patent [19]

Hagstrom et al.

[11] Patent Number: 4,663,921
[45] Date of Patent: May 12, 1987

[54] COMBINE HARVESTER WITH HEADER-MOUNTED SEPARATOR

[75] Inventors: Gerald F. Hagstrom; Daniel L. Leemans, both of Moline; Reed J. Turner, East Moline, all of Ill.

[73] Assignee: Deere & Company, Moline, Ill.

[21] Appl. No.: 371,046

[22] Filed: Apr. 23, 1982

[51] Int. Cl.[4] .............................................. A01F 12/18
[52] U.S. Cl. .................................. 56/14.6; 130/27 R; 130/27 T
[58] Field of Search ............... 56/14.6, 208; 130/27 R, 130/27 T

[56] References Cited

U.S. PATENT DOCUMENTS

| 1,932,714 | 10/1933 | Thoen | 56/21 |
|---|---|---|---|
| 2,644,284 | 7/1953 | Oberholtz et al. | 130/27 R |
| 3,127,340 | 3/1964 | Van Buskirk | 209/152 |
| 3,212,243 | 10/1965 | Mark et al. | 56/21 |
| 3,296,782 | 1/1967 | Mark et al. | 56/21 |
| 3,315,449 | 4/1967 | Morrison et al. | 56/21 |
| 3,431,711 | 3/1969 | Claas | 56/14.5 |
| 3,603,063 | 9/1971 | Stroburg | 130/27 R |
| 3,604,427 | 9/1971 | Boone et al. | 130/27 K |
| 3,945,178 | 3/1976 | Delfosse et al. | 56/14.6 |
| 4,150,525 | 4/1979 | DeBusscher et al. | 56/14.6 |
| 4,180,081 | 12/1979 | Shaver | 130/27 R |
| 4,317,326 | 3/1982 | Riedinger | 130/27 T |

FOREIGN PATENT DOCUMENTS

| 0042824 | 12/1981 | European Pat. Off. | 130/27 R |
|---|---|---|---|
| 232642 | 4/1969 | U.S.S.R. | 56/14.6 |

Primary Examiner—Robert Peshock
Assistant Examiner—John G. Weiss

[57] ABSTRACT

The header of a combine harvester is modified to include an elongated axial flow rotary separator unit having coaxial threshing and separating portions. The unit is interposed in the header between a generally conventional gatherer portion and a feederhouse. The separator axis is transverse of the combine and parallel to the cross auger of the gatherer unit which transfers gathered crop material directly to the receiving portion of the separator rotor. Separated grain and chaff is delivered by the feederhouse to a cleaning shoe carried in the body of the combine. Straw is discharged onto the ground from the downstream end of the separator unit. In one embodiment the combine body is generally conventional except that the removal of the separator unit permits a deeper grain tank for greater grain tank capacity. Alternative embodiments include an articulated configuration for the combine body in which a front bogie supports a forward mounted header and includes an engine and cleaning shoe. Cleaned grain is transferred across the hinge connecting the bogies to a rear bogie which is essentially a self unloading grain tank. In another embodiment, the header includes a pair of coaxial separator units carried end to end behind the gather cross auger.

23 Claims, 11 Drawing Figures

COMBINE HARVESTER WITH HEADER-MOUNTED SEPARATOR

CROSS REFERENCES TO RELATED APPLICATIONS

U.S. patent application Docket No. 8143 filed simultaneously herewith in the name of Riedinger, entitled HINGE ARRANGEMENT FOR AN ARTICULATED COMBINE and assigned to the assignee of the invention herein, is directed in a preferred embodiment to an articulated combine having a hinge arrangement including spaced apart upper and lower links, the upper of which extnds from the rear of the front bogie to the rear of the rear bogie. To the extent that the invention disclosed and claimed in application Docket No. 8143 is disclosed herein, it is done so only for completeness of description of the operative environment of the invention claimed herein and thus forms no part of the invention claimed herein.

U.S. patent application Docket No. 11612 filed simultaneously herewith in the names of Allen et al, entitled GRAIN HANDLING ARRANGEMENT FOR AN ARTICULATED COMBINE and assigned to the assignee of the invention herein, is directed in a preferred embodiment to an articulated combine in which a portion of the hinge arrangement connecting the two bogies does double duty—as a structural component of the hinge and as a conveyor for transferring cleaned grain from the front bogie to a grain tank in the rear bogie. To the extent that the invention disclosed and claimed in application Docket No. 11612 is disclosed herein, it is done so only for completeness of description of the operative environment of the invention claimed herein and thus forms no part of the invention claimed herein.

BACKGROUND OF THE INVENTION

This invention is concerned with combine harvesters having axial flow rotary separators and more particularly with those in which the separator is transversely mounted and forms part of the header of the combine.

It has long been known that axial flow rotary separators are, at least potentially, more efficient than straw walker-type separators in terms of separation capacity per unit volume (volumetric efficiency), but only comparatively recently have such separators been used commercially in significant numbers. The market place was demanding ever larger combine capacity but further increases in conventional combine size (especially vehicle width and even length) were becoming unacceptable because of transport and handling considerations. The axial flow rotary separator thus became more acceptable in spite of certain disadvantages such as higher specific power consumption and some material handling limitations. However, even though machines using axial flow rotary separation have entered the large combine market with some success, their configuration has been characterized by a direct substitution of the rotary separator for the traditional straw walkers. Certainly, in these machines, axial flow rotary separation has generally been combined coaxially with axial flow rotary threshing, but in most cases the rotor axis is disposed fore-and-aft and the rotary threshing and separating apparatus occupies essentially the space previously occupied by the conventional threshing cylinder and straw walkers. This in-line arrangement falls short of realizing the full volumetric efficiency or space saving potential of axial flow rotary separation, the "functional package" of which is essentially cylindrical. In current commercial machines, the separators are generally enclosed within more or less rectangular box-like combine bodies, and the disparity of shape between separator and body, dictated by factors other than the separator shape, results in "wasted" space around the separator and makes it relatively less accessible for service and repair. In another type of commerical machine an axial flow rotary separator is mounted transversely in the combine body but this arrangement also suffere from some of the same space utilization disadvantages as the in-line configuration.

In the past, attempts have been made to include the crop threshing and separation functions within the header of the combine. Conventionally, the header of a combine includes only means for gathering and converging the crop and delivering it to the body of the combine for processing (threshing, separating and cleaning). The header/separator configurations known to have been tried have generally been awkward and cumbersome. They may be characterized at least in part, as simply putting together new combinations or configurations of old components (conveying and functional elements such as feeding conveyors and conventional threshing cylinders and even straw walkers) arranged in a header environment. When header-mounted transversely oriented axial flow separation has been attempted, it has been found necessary to use at least two separate elements to achieve the threshing and separation. For example, threshing and separating elements are placed in tandem. And commonly, a beater feeder must be used between the gathering or platform portion of the header and the threshing and separating portion.

Even a conventional header for a large capacity combine raises problems of efficient structural design and vehicle stability and "exotic" solutions have already been proposed, such as the use of new lighter weight materials, or even conceding that the maximum practical width of gatherer may have been reached. Thus, attempting to include in the header the additional functions of threshing and separation, obviously only severely intensifies the structural and stability problems. So far as is known, no header-mounted separator has been sufficiently space and functionally efficient to achieve commercial success.

SUMMARY OF THE INVENTION

The objects of the present invention therefore include more fully realizing the inherent advantages of the axial flow rotary separation principle and so integrating a separator of this type into a header that the specific weight distribution of the header does not impose unacceptable limits on gatherer width. Efficiently integrated into the header, in terms of both function and structure, the axial flow rotary separator weight increase, and hence cantilever loading at the front of the combine, is minimized; the size of the separator is not magnified redundantly by enclosing it in a nonconforming body or support structure; and, of course, the separator itself becomes more accessible for adjustment, service or repair.

It is a feature of the invention that an axial flow rotary separator, providing the crop processing functions of threshing and separation, is interposed between the gatherer and feederhouse portions of the header in a manner which not only eliminates the need for auxiliary intermediate or transitional components, but results in a configuration minimizing the relative increase in cantilever loading of the header with respect to the combine body. Thus, for example, there may be direct transfer of crop material, from a generally conventional, laterally conveying and converging auger of the gatherer portion, over a feeding ramp into largely circumferential engagement by an infeed portion of a separator rotor whose axis is parallel to that of the gatherer auger.

Grain and chaff from the separator may be collected by a transverse conveyor running closely beneath the separator and delivered to the foot of an upwardly and rearwardly sloping feeder conveyor for delivery to the body of the combine. The particular disposition chosen for the principle functional components including, for example, center distance between cross auger and separator rotor in relation to the respective gatherer cross auger and rotor diameters, the vertical relationship of the axes of those elements as well as the juxtaposition of the collecting conveyor and foot of the feederhouse conveyor, all contribute to compactness coupled with efficient material handling, minimizing of header overhang weight (and keeping header center gravity as far to the rear as possible) and with providing adequate ground clearance for the "heel" (rear lower portion) of the header and the foot of the feederhouse. Efficient material handling in a header according to the invention includes maintaining control of and smoothly transferring material between the header cross conveyor and separator rotor and results, in part, from a component arrangement providing a feeding ramp between them of such a form as to minimize dead space between them.

Preferably the diameter chosen for the generally cylindrical separator unit is such that the length of separator required to provide sufficient capacity for the crop gathering portion with which it is associated, is equal to or less than the length of that gatherer portion (this is generally true for direct cut types of gatherer but not necessarily so for windrow pickups). At the same time, minimizing the separator unit diameter by making it as long as possible limits the fore-and-aft extension of the header resulting from the interposing of the separator between the gatherer and the feederhouse.

In keeping with the invention, the gatherer, along with the integral separator unit, may be detachable from the feederhouse in a similar way and for the same reasons that gathering portions or platforms are detachable from feederhouses in conventional headers.

Also in keeping with the invention, two or more coaxial and contiguous but substantially functionally independent separator units may be employed so as to minimize the material handling capacity and hence diameter required in any one of those units, compared with a single unit of the same total capacity. Use of a plurality of separator units or modules also has the potential for minimizing required gatherer lateral conveyor capacity and hence cross-sectional dimensions. The required capacity of a given section of the conveyor is reduced in proportion to the number of separator units greater than one. When two or more separator units are employed, they may be arranged so that the direction of axial flow of crop material within adjacent units is either in the same (lateral) direction or in opposite directions. Depending on the material flow direction of the separator units, more than one individual gatherer discharge (or separator feed) opening may be required. An advantageous embodiment, adaptable to a wide range of combine capacity sizes, includes a symmetrical gatherer/separator arrangement employing two separator units arranged so that single central discharge from the gatherer feeds the juxtaposed side-by-side respective feed or receiving portions of the two separators. Straw is discharged downstream in each case—that is adjacent the laterally opposite ends of the header. Advantages of this arrangement include simplifying construction of the cross auger of the gatherer in that the modification of the auger adjacent the gatherer discharge opening for more efficient discharge (for example, provision of retracting fingers or beater blades), is restricted to one portion of the auger. In addition, lateral variations in the flow of material arriving at the gatherer discharge opening are better accommodated because of the unrestricted possibility for the material to flow into and be received by either one of the juxtaposed separator feeding sections registering with the single discharge outlet of the gatherer.

Deriving from the header-mounted separator concept is the simplification of the propelling vehicle and the opportunities it offers for utilization of that vehicle. If the header is fully cantilevered, the propelling vehicle must of course provide a stable "platform" or base for it. In general, this will means that the propelling vehicle will be of such general minimum dimensions as to provide space for grain tank capacity and cleaning shoe treatment relatively much greater than in either a so-called conventional combine (transverse circumferential-flow threshing cylinder, with straw walkers) or the typical existing commerical in-line axial flow rotary combine. Given that the axial flow rotary separator, even header-mounted, is essentially slope insensitive, the extra space potentially available in the combine body (or propulsion vehicle), may be more than adequate for the housing of a slope insensitive cleaning mechanism, thus making the total combine largely slope insensitive. The typical existing commerical in-line axial flow rotary combine on the other hand offers, as a significant advantage over conventional straw walker combines, only the slope insensitivity and volumetric efficiency of the axial flow rotary separator unit itself.

A header with separator according to the invention is also particularly adaptable for use with unconventional propulsion vehicle concepts such as a four-wheel articulated or hinge steered propulsion unit. In a desireable arrangement, the header delivers grain and chaff to a cleaning device in a forward two-wheeled unit (or bogie), which also provides an operator's station and an engine providing power for all functions of the combine. Clean grain may then be transferred to the rear unit (or bogie) of the articulated unit which may consist essentially of a two-wheeled self-unloading grain tank or cart.

DESCRIPTION OF PREFERRED EMBODIMENT

Figure 1:
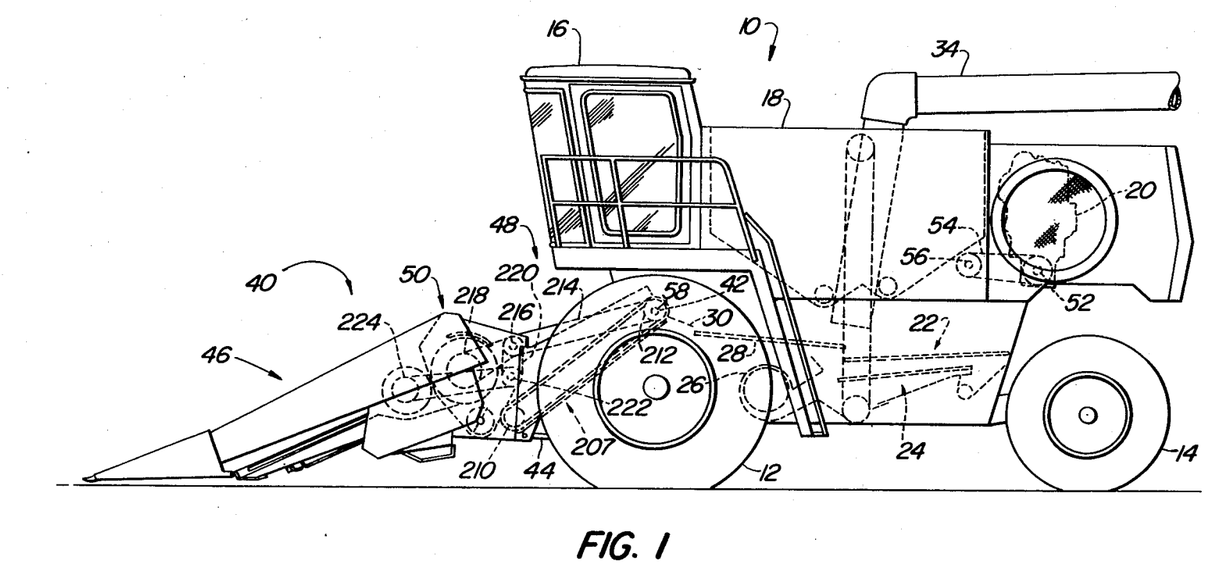
FIG. 1 is a semi-schematic left-hand side elevation of a combine harvester embodying the invention.

The invention is embodied in a self-propelled combine such as that shown in overall side view in FIG. 1. The combine body 10 is of the conventional rigid or stiff-back type and is supported above the ground by a pair of forward drive wheels 12 and steerable rear wheels 14. An operator's station is mounted forward and offset to the left immediately ahead of a grain tank 18. The entire combine is powered from a rear mounted engine 20.

The cleaning mechanism 22, carried in the lower portions of the body 10 beneath the grain tank 18, is generally conventional and includes a pair of oscillating sieves 24 and a blower 26 for assisting in the cleaning operation. Material for cleaning is delivered to the sieves 24 by an oscillation grain pan 28, the forward edge of which underlies a rearwardly and downwardly sloping deflector plate 30 carried by the frame of the combine. A clean grain elevator 32 delivers clean grain into the tank 18 from which it may be unloaded by an unloading conveyor assembly 34.

A header 40 is supported from a forward portion of the combine body 10 in the conventional way. Pivots 42, one on each side of the header, permit pivoting about a transverse horizontal axis, controlled by hydraulic cylinders 44 as required to adjust operating or transport height of the header. As is conventional, the header 40 includes a forward gatherer portion 46 and a rearwardly and upwardly sloping feederhouse 48 but, unconventionally, a separator portion 50 interposed between the gatherer 46 and feederhouse 48. The feederhouse structure carries the header pivots 42.

Drives for the header 40 are taken from an engine power shaft 52 by way of a belt drive 54 to a primary countershaft 56. From there, power is distributed to the various components of the combine by conventional means (not shown) including a drive to a countershaft 58 assembly coaxial with the header pivots 42 for driving the header 40.

Figure 2:
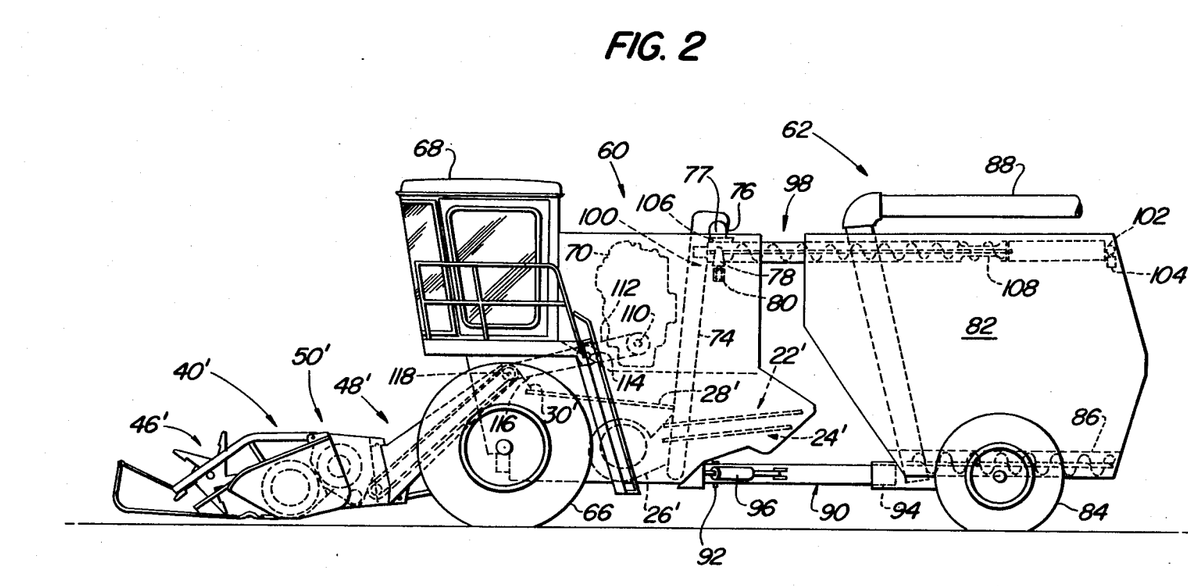
FIG. 2 is a semi-schematic left-hand side elevation of an alternative embodiment in which the combine body is articulated.

In an alternative embodiment of the invention, shown in FIG. 2, the combine body is articulated, comprising front and rear bogies 60 and 62 respectively, carrying a forward mounted header 40'.

The front bogie 60 is supported above the ground on a pair of drive wheels 66 and includes an operator station 68, an engine 70 and in a lower portion of the bogie, a cleaning mechanism 22'. This cleaning mechanism is similar to that described above (22) and includes sieves 24', blower 26', grain pan 28' and deflector plate 30'. Clean grain is raised from the cleaning mechanism 22' by a clean grain elevator 74 and then conveyed laterally to approximately the fore-and-aft centerline of the front bogie by a cross auger 76 having a downwardly directed outlet 77. Immediately below the discharge outlet 77, a yoke 78 for pivoting about a vertical axis is carried in an upper frame cross member 80.

The rear bogie 62 is essentially a grain tank with a main body or tank portion 82 supported above the ground on a pair of wheels 84. Unloading is by a fore-and-aft bottom auger 86 and a swingable unloading auger assembly 88.

The rear bogie 62 is connected to the front bogie 60 by widely spaced upper and lower hinge members permitting relative pivoting between the bogies about an upright axis and oscillation about a fore-and-aft axis. The lower connection is made by a tongue assembly 90, pivtoally connected to the front bogie 60 by a pivot connection 92, vertically aligned with the pivot yoke 78. The tongue 90 includes a swivel bearing 94 permitting oscillation of the rear bogie 62 relative to the front bogie 60 about a fore-and-aft axis. Hydraulic steering cylinders 96 connected between the frame of the front bogie 60 and the tongue 90 control pivoting between the front and rear bogies about an upright axis for steering the vehicle.

The upper connection between front and rear bogies is made by a long link 98 which is also a transfer auger assembly. The yoke 78 provides a pivotable connection 100 of the link 98 to the front bogie 60 while the connection to the rear bogie 62 is by a ball and socket connection 102 carried approximately on the fore-and-aft centerline of the rear bogie 62 by a transverse upper frame member 104. Grain being transferred from the front bogie enters the transfer auger assembly 89 at an inlet 106, registering with the outlet 77 of the cross auger 76, and is discharged into the rear bogie grain tank 82 through an outlet 108.

Power for all components of the combine is taken from an engine power shaft 110 in part by way of a belt drive 112 to a primary countershaft 114 and thence by a header drive belt 116 to a header countershaft assembly 118 from which the entire header 40' is driven including its respective gatherer, feederhouse and separator portions, 46', 48' and 50' respectively.

As is well known, the headers of combine harvesters may be equipped with a variety of interchangeable gatherer units to suit particular crops or harvesting conditions. The present invention is adaptable to any gatherer type but only two exemplary types are included in this description—the so-called corn head (gatherer 46 in FIG. 1) and a grain cutting platform (gatherer 46' in FIG. 2). The headers 40 and 40' carrying these gatherers and their integral separator units 50, 50' will now be described in more detail.

Figures 3, 11:
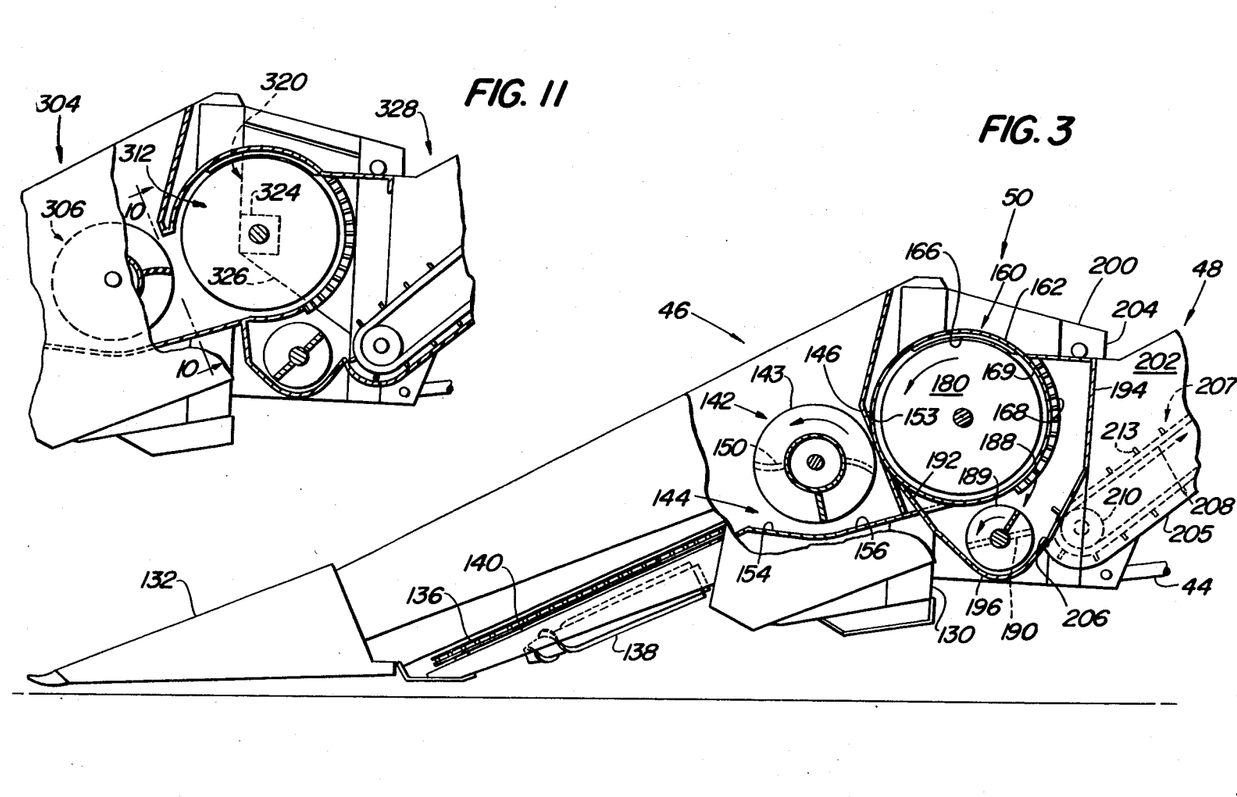
FIG. 3 is an enlarged partial view approximately on line 3—3 of FIG. 5 showing in more detail the gatherer (corn head) and separator unit.
FIG. 11 is a partial view similar to FIG. 7, taken approximately on line 11—11 of FIG. 10 showing the center support arrangement for the twin separator rotors of the embodiment of FIG. 6.

The forward portion of the header 40 including the corn head 46 is shown in more detail in FIG. 3. The corn head portion is generally conventional except that it is integrated with the separator portion 50, the two functional units being integrated in part through a frame structure 130.

Figure 5:
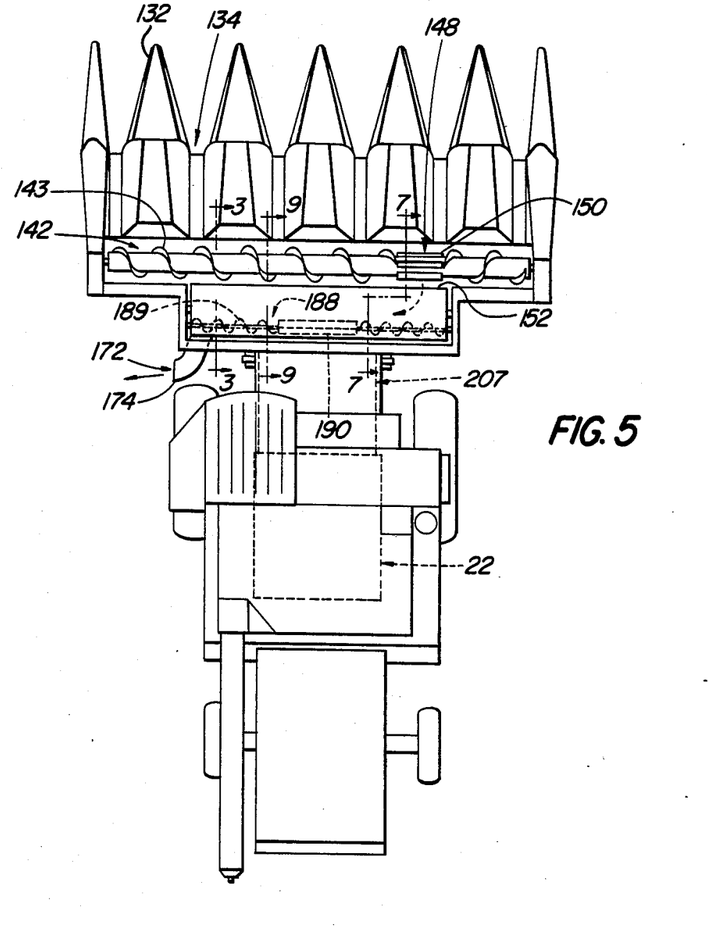
FIG. 5 is a semi-schematic overhead view of the embodiment of FIG. 1.

The corn head 46 is a row crop device and so is equipped with divider points 132 for guiding plants or stalks into the throats 134 of the respective row units as the combine advances down the rows of standing crop (see FIG. 5). Gatherer chains 136 then guide the stalks rearwardly relative to the corn head while the stalk rolls 138 pull the stalk downwards and corn ears are snapped from the stalk by deck plates 140. The gatherer chains 136 convey the ears rearwardly and upwardly and deliver them to a cross auger 142 extending laterally, immediately behind and spanning the row units (see also FIG. 5). Flighting 143 on the cross auger 142 cooperates with an auger floor 144 and rear wall 146 to converge crop material including ears laterally from the left- and right-hand portions of the corn head towards a discharge point 148 located towards the right-hand end of the corn head. Here the auger flighting is interrupted and radially extending discharge paddles 150 serve to discharge crop material rearwardly and somewhat upwardly through an outlet 152 (having an upper horizontal edge 153) in the rear wall 146. To assist in efficient conveying and transfer of material, the cross auger floor 144 partially wraps the auger 142, the floor comprising an approximately horizontal forward portion 154 and a rear portion 156 sloping only slightly upwardly when the header is in the normal operating height range.

Figure 9:
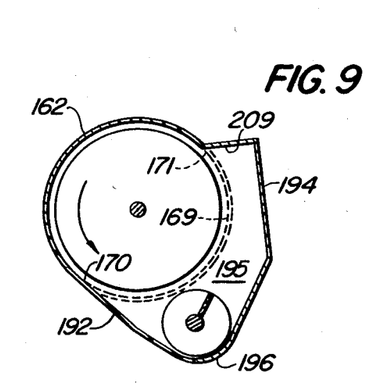
FIG. 9 is a partial cross-sectional view taken approximately on line 9—9 of FIG. 5 to show a typical cross section of the separator unit, outboard of the feederhouse.

The separator portion 50 of the header includes an axial flow rotary separator assembly 160 comprising a generally cylindrical separator casing 162 substantially tangential with the gatherer rear wall 146 and cut away so that the outlet 152 is also essentially the inlet of the separator. A series of helically disposed guide vanes 166 are spaced along the upper inner surface of the casing 162. Foraminous portions of the casing 162 include a concave 168, best seen in FIGS. 3 and 7, adjacent the upstream end of the separator, and, extending downstream of the concave, a separating grate 169 generally spanning approximately the rearward and lower half of the casing and having rotationally leading and trailing boundaries 170, 171 (FIG. 9). At the extreme downstream end of the casing 162 is an outlet 172 (seen best in FIG. 5) and, external to the casing 162, a deflector arrangement 174 for controlling the direction of material discharged from the casing.

A generally cylindrical separator rotor 180 is concentrically and rotatably mounted in the casing 162 and carries on its periphery, conventional material control elements (not shown except for the feed elements in FIG. 10) to provide, in cooperation with the csing 162, the conventionally required functions of feeding, threshing and separating.

The separator assembly 160 also includes a collecting auger 188 having an axis of rotation parallel to the axis of the rotor 180 and below and somewhat to the rear of that axis. Auger flighting 189 of the auger 188 is interrupted in its center portion by a discharge paddle arrangement 190, registering with and spanning most of the width of the feederhouse 48 (seen best in FIG. 5).

Figure 7:
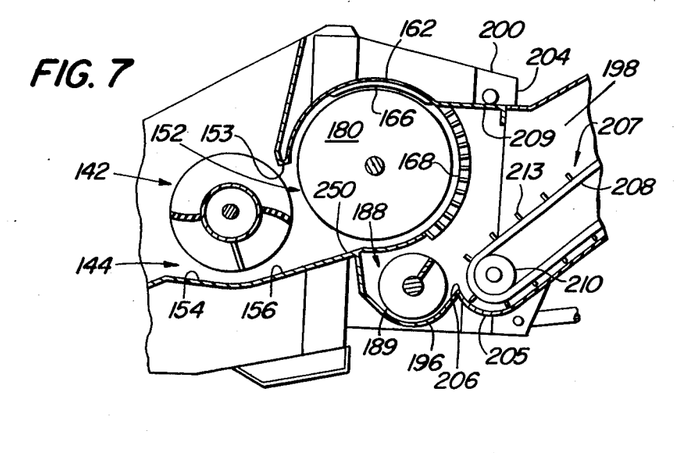
FIG. 7 is a partial cross-sectional view taken approximately on line 7—7 of FIG. 5 in the inlet area of the corn head/separator combination.

Separator housing walls front and rear, 192 and 194, respectively, extend substantially the full length of the separator casing 162 and define a collecting chamber 195 (FIG. 9) containing or embracing the foraminous portions 168, 169 of the separator casing 162 and converging below the collecting auger 188 to form a collecting auger trough 196. The forward wall 192 is of course interrupted by the gatherer outlet/separator inlet openings 152 as indicated in FIGS. 5 and 7. The rear wall 194 is discontinued at the feederhouse 48 to provide virtually unrestricted entry 198, across the full width and depth of the feederhouse. This separator outlet is surrounded and approximately defined by a conventional rectangular gatherer-to-feederouse coupling frame 200, integral with the separator housing.

The walls of the feederhouse 48 define a passage 202 of generally rectangular cross section (as is conventional), bordered at its forward end by a rectangular coupling frame 204 which mates with the coupling frame 200 of the separator housing for coupling together the feederhouse 48 and the gatherer/separator combination 46/50 together in a manner that is conventional for coupling gatherer to feederhouse in a conventional header. The lower forward portion 205 of the floor of the feederhouse 48 curves upwards to mate with the auger trough 196 at a laterally extending edge 206, defining the lower boundary of the feederhouse inlet 198. The upper limit of the inlet 198 is defined by a short rearwardly extending separator housing wall portion 209. An endless belt conveyor 207 extends through the feederhouse 48 and includes a conveyor belt 208 trained around top and bottom rollers 210 and 212 respectively. The belt is ribbed or cleated (213) for more positive conveying. The lower receiving end of the conveyor 207 is in an overshot receiving relationship with the discharge paddle portion 190 of the collecting auger 188.

Power transmission for the header is conventional and is shown only schematically (FIG. 1). Power is taken from the countershaft assembly 58 by a belt drive 214 which powers a laterally extending backshaft 216. The separator 50 is driven directly from the shaft 216 by belt drive 218. For the corn head (gatherer) 46, a transfer belt drive 220 takes power from the backshaft 216 to a corn head backshaft 222 and a final belt drive 224 to the corn head. A reversing arrangement (not shown) may be included in the countershaft assembly 58 so that the overshot feed conveyor 207 is driven in the required direction. The elevated disposition of the respective backshafts 216, 222 places them clear of the separator straw discharge outlets 172. Internal drives to components of the separator portion 50 and corn head 46 are conventional and not shown in the drawings.

Figure 4:
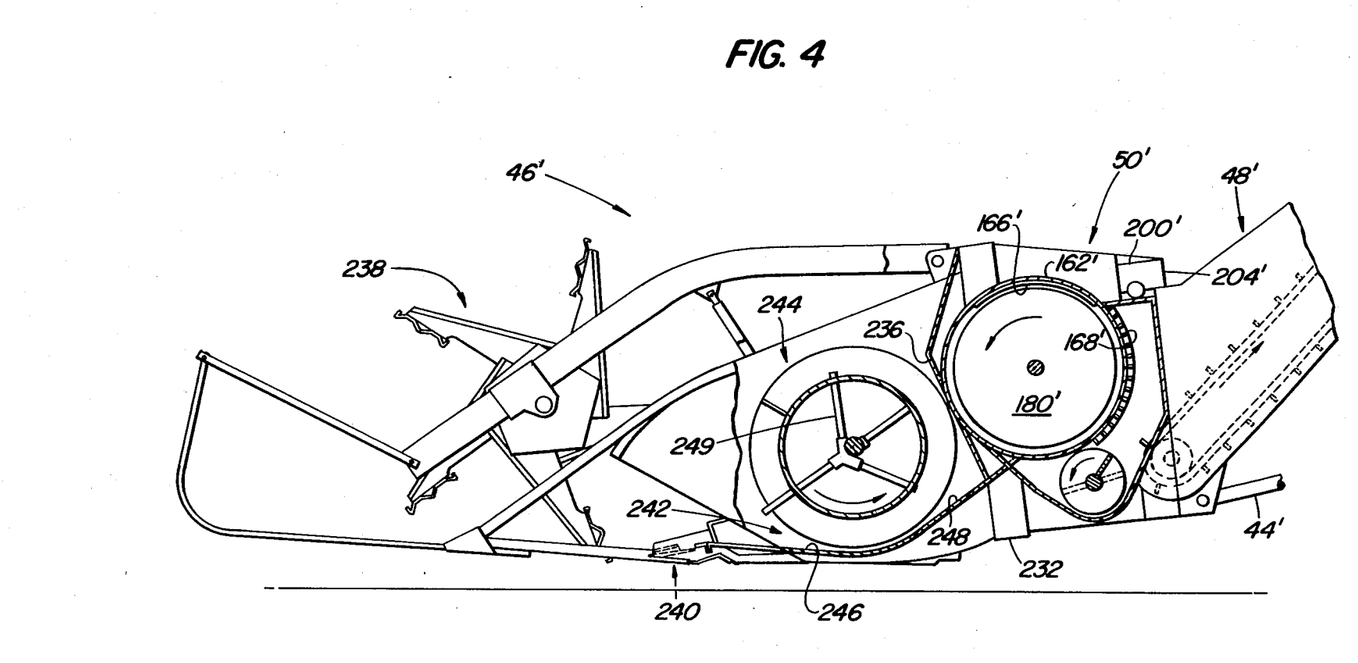
FIG. 4 is an enlarged partial view similar to FIG. 3 of the embodiment of FIG. 2 showing in more detail the gatherer (grain cutting platform) and separator unit.

Turning now to the alternative embodiment gatherer/separator combination shown in FIGS. 2 and 4—the combination includes a separator portion 50' similar to that of the corn head unit described above and similar conventional means for coupling to the feederhouse 48'. It includes a frame structure 232 for integrating the separator portion 50' with the gatherer portion 46', the separator casing 162' again approximately touching the rear wall 236 of the gatherer portion 46'.

The structure of the gatherer portion 46', in this case of the cutting platform type, is in large part conventional and includes a reel 238 for guiding crop material onto the cutterbar 240 and rearwardly over the platform floor 242 into engagement with a platform auger 244. The platform floor 242 includes an approximately horizontal forward portion 246 and a rearwardly and upwardly sloping rear portion 248 each portion being approximately tangential to the flighting of the auger 244. In a manner similar to that described above for the corn head version, the platform auger 244 converges material for discharge through a discharge opening 152' into the separator. In this case however, conventional retracting fingers 249 effect the tangential rearward discharge.

In operation, in the embodiments of both FIGS. 1 and 2, crop material is gathered and delivered to the separator inlet 152, 152' for engagement by the separator rotor 180, 180' as described above.

As can be seen from FIGS. 3 and 4, in both embodiments the relatively small diameter of the separator rotor (180, 180') and its closeness to the gatherer auger (142, 244) helps to minimize the "dead space" between auger and rotor for more efficient transfer of crop material. In addition, the smaller diameter of the rotor makes it more feasible to dispose the rotor more rearwardly of rather than above the gatherer cross auger and so minimize the steepness of the slope at which crop material must be transferred into the rotor without unacceptable forward shifting of the center of gravity of the header as a whole. Preferably the ratio of center distance between the conveyor auger and separator rotor axes to the sum of their radii of revolution should be no greater than about 1.1 to 1.0. A header for harvesting small grain, such as the grain platform of FIG. 4, must be capable of handling large volumes of crop material with a high MOG ratio (material other than grain to grain), both in the cross auger and in the separator. In a small grain header, according to the invention, it has been found feasible to limit separator length to less than gatherer width and still provide MOG and separator capacity matching that of the cross auger, using a separator rotor diameter no greater than that of the gatherer cross auger.

As in these embodiments, the planes of the gatherer rearward floor portions (156, 248) which establish the basic direction of feeding or transferring the mass of crop material into the separator, preferably intercept the separator rotor (180, 180') at a point below the rotor center and preferably at about, but not less than half a radius from the center, so as to minimize the dead space between cross auger and rotor (see FIGS. 7 and 8). To help maintain control of the material the floors are extended rearwardly (250, 252, respectively) at the inlets 152, 152' to approximately meet the separator casing 162, 162'. The extended floor portions, 156-250, 248-252 respectively, define crop material feed ramps.

As FIGS. 3 and 4 indicate, the nature of the particular gatherers is such that at normal operating heights a flatter almost horizontal feed ramp slope is possible with the corn head (FIG. 3), but even with the cutting or grain platform (FIG. 4), the slope is not greater than about 45 degrees. At the crop material transfer point (inlet opening 152, 152') the typical corn crop gathered material has a low MOG ratio and moves less readily uphill than the bulkier high MOG ratio material of the typical small grain crop.

The above described spatial and dimensional relationships of gatherer cross auger, cross auger floor and rotor make possible a smooth and efficient transfer from cross auger to infeed rotor without the need for an auxiliary intermediate conveyor member such as a feeder beater.

The feeding, threshing and separating functions of axial flow separator units are well known and need not be described in detail here (see for example, U.S. Pat. Nos. 4,192,322 or 4,178,943). In this embodiment, the rotating rotor 180 cooperates with the casing 162, and particularly the guide vanes 166, to propel crop material spirally downstream in the annular space between rotor and casing. Straw is discharged from this annular space onto the ground at the downstream end of the separator unit, through discharge chute 172. Grain and at least some chaff passes through the foramina of the threshing and separating grates 168 and 169 respectivley and, deflected and contained by the separator housing walls 192, 194, is collected in the auger trough 196, for convergence by the collecting auger 188 and transfer to the feederhouse conveyor belt 208 by the tangential discharge of the paddles 190.

Figure 8:
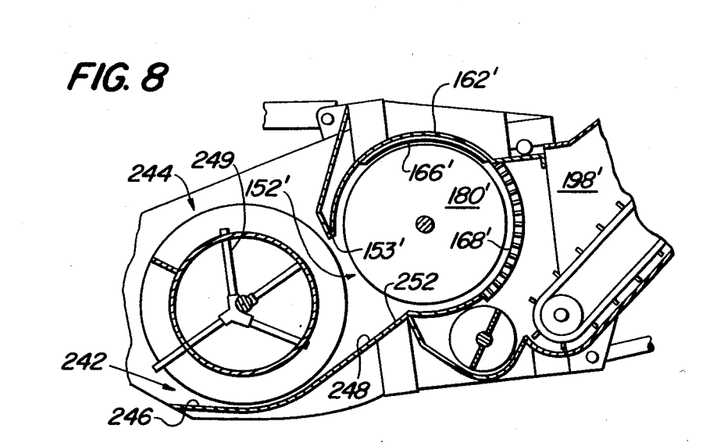
FIG. 8 is a view similar to FIG. 7 of the grain platform/separator combination.

As shown particularly in FIGS. 7, 8 and 9, foraminous portions of the separator casing are provided only in the rearward and lower half of the casing, opening directly into the collecting chamber 195. The separator casing 162 is vertically tangential to the interface of junction between separator unit and feederhouse. This arrangement minimizes the overall size of the separator unit envelope defined by the casing 162 and housing walls 192, 194 and contributes to the compactness of the header. Also, the proximity of the threshing concave or separating grates to the feederhouse entry 198 and hence to the lower portion of the feeder conveyor 207 means that, at least where the concave or grates are longitudinally aligned with the feederhouse, some of the grain and chaff, passing generally radially outwards through the foramina, may be deposited directly on the feeder conveyor belt 208, thus helping in overall material handling efficiency.

The relatively rearward and somewhat elevated disposition of the collecting auger 188 as well as helping to provide adequate ground clearance under the separator portion, makes possible a simple transfer of grain and chaff to the feederhouse conveyor. The collecting auger 188 and the feeder conveyor bottom roller 210 are respectively on opposite sides of but closely adjacent the connecting interface between the gatherer/-separator unit and the feederhouse. The bottom roller 210 of the conveyor may then be positioned sufficiently above the collecting auger 188 so that a simple tangential discharge by the auger paddles 190 may be directed efficiently onto the foot of the belt 208, in overshot fashion. The feeder conveyor belt 208 delivers the grain and chaff mixture to the cleaning shoe 22 by way of the deflector plate 30. As indicated in FIG. 5, the width of the feeder conveyor 207 is approximately equal to the width of the cleaning shoe 22 making it unnecessary to provide special means for distributing the incoming grain and chaff mixture across the width of the shoe. Processing of the grain and chaff mixture in the cleaning shoe to remove chaff and other small fractions, delivery to the grain tank, and subsequent unloading from the tank are all conventional.

Figure 6:
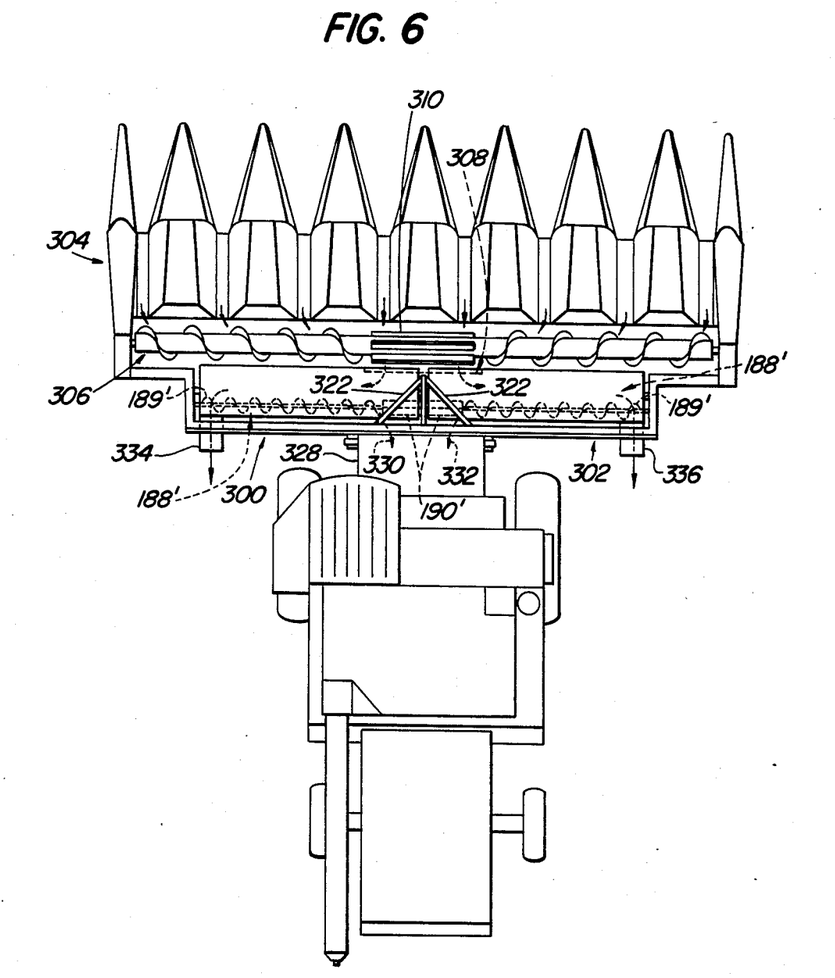
FIG. 6 is a view similar to FIG. 5 of an alternative embodiment in which the header includes a pair of coaxial separator units.
Figure 10:
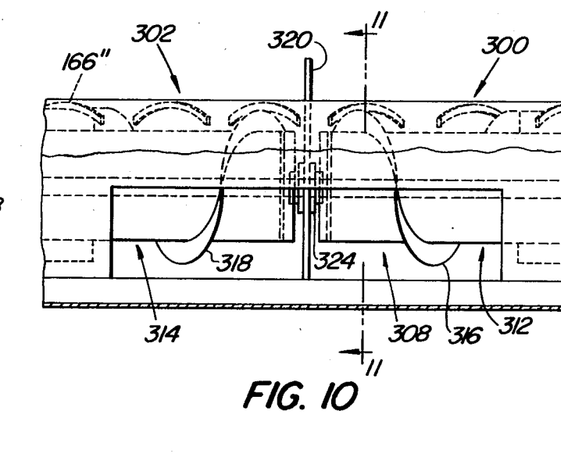
FIG. 10 is a partial front view taken approximately on line 10—10 of FIG. 11 of the separator inlet area of the alternative multiple separator embodiment.

FIGS. 6, 10 and 11 illustrate some aspects of an alternative embodiment having more than one coaxial separator unit. In this example, left- and right-hand units 300, 302 respectively, are united with an eight-row corn head 304. The inlet or receiving ends of the separators abut at the center of the machine and the corn head cross auger 306 converges gathered crop material for feeding to the separators through the single common inlet 308, assisted by a paddle section 30.

As indicated in FIG. 10, the inlet 308 registers equally with the feed or receving portions of the left- and right-hand rotors 312 and 314 respectively. The rotors may be fitted with feeding elements such as the auger flighting 316 and 318 shown, for rapidly deflecting received crop material downstream into the more purely functional portions of the separators. the rotors are supported by a common support plate 320 braced from the rear frame structure of the header by braces 322 and journaled in bearings 324 carried by the plate. As is desirable, this form of support requires only a relatively small gap between the ends of the rotors 312 and 314. With the upstream ends of the feeding elements of the two rotors closely juxtaposed (a gap of about 35 millimeters or less is preferred) the rotors together begin to split the flow of crop material as soon as it is engaged and, with the help of helical elements on the separator casing such as guide vanes 166", rapidly move it downstream. This undivided inlet arrangement helps to ensure feeding at approximately equal rates for both the left- and right-hand separator portions. As indicated in FIG. 6, the paddle or beater portion 310 of the corn head cross auger 306, is preferably somewhat narrower than the inlet 308 tending to converge the flow of material towards the center of the inlet. Excess material flow from one side or the other tends to cause the center of flow to surge past the inlet centerline giving the exposed, uninterrupted, live rotor surface an opportunity to engage the full flow of material and tend to equalize the flow into the two separator portions. Entering material is immediately deflected downstream so that if the lower portion of the support plate 320 recedes as indicated at 326 in FIG. 11, there is no tendency for entering material to hairpin on the support plate.

In the multiple flow path configuration of FIG. 6, the general direction of feeding of grain and chaff into the feederhouse 328 by the collecting auger assembly 188' is indicated by arrows 330, 332. Straw is discharged from the downstream ends of the separators 300, 302 from outlets 334, 336 on opposite sides of and well clear of the propelling vehicle.

With the structure and configuration according to the invention, a combine with header mounted separator, whether stiffback or articulated, is seen to have a number of important advantages over a conventional combine of similar capacity. These include compactness, aiding in shipping, transporting and maneuvering of the vehicle, and improved weight distribution.

In addition, a practical and efficient incorporation of an axial flow rotary separator into the header makes space available in the main body of the combine for a relatively larger grain tank or more adequate cleaning shoe, or both, while maintaining a low vehicle profile so that an operator may have unusually good rearward visibility above the grain tank from the operator's station. Stability of the vehicle is enhanced by the inherently lower center gravity made possible by the configuration, whether in the stiff back version of FIG. 1 or articulated as in FIG. 2.

Removing the axial flow separator from the body of the combine also reduces noise and vibration experienced at the operator's station. And it eliminates the air currents generated by the separator rotor, which in conventional axial flow combines, may adversely affect the function of the cleaning shoe conventionally positioned below the rotor.

Another advantage of placing the separator in the header, especially when it is relatively close to ground level as in the present invention, is accessibility for adjustment and repair. Also power consumption is reduced relatively because only a small, easily handled portion of the gathered crop material (grain and chaff mixture) is now carried through the feederhouse, and because of the inherently more efficient tangential transfer from gatherer cross auger to separator rotor feed section, compared with the various forms of axially directed end-feeding or undershot feeding common in conventional axial flow rotary combines. Chances of plugging are greatly reduced when the total volume of gathered crop need not be concentrated as in a conventional feederhouse. If plugging does occur in the separator or at its entry, the exposed and relatively close-to-the-ground disposition of the separator facilitates clearing the blockage.

We claim:

1. A combine harvester comprising:
   a mobile body having a power source and including a cleaner mechanism for receiving threshed and separated grain and delivering clean grain, a grain tank for receiving and holding clean grain and a conveyor for conveying the clean grain delivered by the cleaner to the grain tank;
   a harvesting header pivotably supported by and forwardly of the mobile body and including means for controlling the operating height of the header relative to the body;
   a gathering unit included in the header for removing crop material from a field, including a laterally elongated conveyor portion having a floor and a rear wall and an outlet in the wall and an elongated conveyor element extending above the floor for transferring crop material laterally with respect to forward motion of the combine and principally in a first lateral direction towards the outlet and said conveyor element including a discharge portion for propelling crop material through the outlet;
   an axial flow rotary threshing and separating unit included in the header, rigidly connected to the gathering unit and disposed immediately rearwardly of the gatherer lateral conveyor with its axis of rotation approximately parallel to the gatherer conveyor, said unit including a rotor having coaxial means for feeding, threshing and separating crop material and said rotor being surrounded by an at least partially foraminous casing, the casing including a rearwardly directed downstream outlet and an inlet opening adjacent an end of the rotor and registering and contiguous with the gatherer outlet and said rotor feeding means being disposed closely rearwardly adjacent the conveyor element discharge portion so as to facilitate direct transfer of crop material from the gatherer conveyor into engagement by the rotor so that the rotor, cooperating with the casing, may propel the crop material generally spirally downstream through the casing in an axial direction of motion opposite to that of the first lateral direction, a first portion of the crop material, including threshed and separated grain, passing outwards through foramina of the casing and a second portion passing through the casing outlet;
   a feederhouse included in the header for pivotaly attaching the header to the body and including an upwardly and rearwardly inclined housing, housing a unitary conveyor, said conveyor having a discharge end in a substantially stationary delivery relationship with the body for delivery only to the cleaner mechanism and a receiving end, said housing also having a receiving end, surrounding the conveyor receiving end, and defining an approximately rectangular opening substantially rearward of and vertically overlapping the separating unit, said housing receiving end being rigidly connected to the separating unit so that the gathering and separating units and the feederhouse may pivot together as a unit with respect to the combine body;
   a lateral collecting conveyor included in the header and disposed below the separator unit, and having a portion in a delivery relationship with the receiving end of the feederhouse conveyor;

wall means included in the header for diverting at least a part of the first portion of crop material into engagement with the collecting conveyor for conveying laterally and delivery to the receiving end of the feederhouse conveyor; and drive means connected between the power source and the header for driving the header.

2. The combine of claim 1 wherein the length of the separating unit is substantially greater than the width of the feederhouse and the lateral extent of the gatherer is at least as great as the length of the separating unit.

3. The combine of claim 1 wherein the width of the feederhouse conveyor is approximately equal to that of the cleaner mechanism for facilitating the delivery of the first portion of crop material approximately uniformly across the width of the cleaner mechanism.

4. The combine of claim 3 wherein the cleaner mechanism includes a fore-and-aft extending grain and chaff conveyor having a width approximately equal to that of the feederhouse conveyor and disposed in a receiving relationship with the feederhouse conveyor for conveying grain and chaff rearwardly and at least one oscillating sieve in a receiving relationship with the grain and chaff conveyor.

5. The combine of claim 1 wherein the collecting conveyor is of the auger conveyor type and includes an auger conveyor and a trough and said trough is offset downwards from the floor of the gatherer conveyor.

6. The combine of claim 5 wherein the feederhouse conveyor includes upper and lower rollers and an endless conveyor element, trained around the rollers and having an upper run and wherein the direction of rotation of the collecting conveyor auger and the configuration of the trough of the collecting conveyor adjacent the delivery portion of said conveyor are such that the collecting conveyor auger discharges crop material tangentially, rearwardly and upwardly and into engagement with a lower portion of the upper run of the feederhouse conveyor.

7. The combine of claim 1 wherein the gatherer conveyor element is a rotatable conveyor auger disposed in a conveying relationship with the conveyor floor and rear wall and wherein the gatherer floor includes a rearwardly extending crop material feed ramp aligned with the separator casing inlet for at least partially controlling the transfer of material from the gatherer conveyor to the separating unit and wherein the surface of the feed ramp lies generally in a plane which intersects the rotor below its axis between approximately one-half and one full radius from the axis.

8. The combine of claim 1 wherein the gatherer conveyor element is a conveyor auger and the ratio of the center distance between the conveyor auger and separator rotor axes to the sum of their respective radii of revolution is no greater than about 1.10 to 1.0.

9. The combine of claim 1 wherein the separator casing is approximately tangential to the rear wall of the gathering unit.

10. The combine of claim 1 wherein the gatherer conveyor element is a conveyor auger and the ratio of the respective diameters of the separator rotor and the conveyor auger is not greater than about one to one.

11. The combine of claim 10 wherein the axis of the separator rotor is disposed rearwardly of and somewhat below the upper limit of the periphery of the conveyor auger.

12. The combine of claim 1 wherein the foramina of the casing are disposed only generally rearwardly and downwardly of the separator rotor axis.

13. The combine of claim 12 wherein at least a portion of the foraminous portion of the casing is adjacent the receiving end of the feederhouse conveyor and substantially laterally overlays said conveyor so that at least some of the first portion of crop material may pass directly to the conveyor.

14. The combine of claim 1 wherein the header further includes releasable coupling means including a first portion carried by a rearward portion of the separator unit and a second portion carried by the receiving end of the feederhouse for facilitating the separation of the forward portion of the header, comprising the gathering and separating units, from the feederhouse.

15. The combine of claim 14 wherein said coupling means comprises an upright frame defining a coupling plane and said separator casing is approximately tangential to said plane.

16. The combine of claim 1 wherein the wall means of the header includes a generally upright wall closely and rearwardly adjacent a foraminous portion of the separator casing and having an opening registering with the receiving end of the feederhouse so that at least a part of the first portion of the crop material may pass directly into engagement with the feederhouse conveyor.

17. The combine of claim 1 wherein the drive means includes a header backshaft disposed above the feederhouse and closely adjacent a rear upper portion of the threshing and separating unit and means connected between that unit and the backshaft for driving the threshing and separating unit.

18. A combine harvester having a mobile body including an engine, a grain tank and a crop processing unit and carrying a forward mounted header, pivotally mounted on the body for selective control of operating height, the header including a forward elongated, laterally extending gathering portion and a rearwardly and upwardly extending feederhouse rearward of the gathering portion and providing at least part of the mounting of the header on the body, characterized in that a transversely disposed axial flow rotary separator is interposed and rigidly connected between the gatherer portion and the feederhouse for receiving and processing crop material from the gatherer portion and delivering a first portion of that crop material to the feederhouse for transfer to the body of the combine.

19. The combine harvester of claim 18 wherein the mobile body comprises a forward unit carrying the header and supported on a pair of wheels, said wheels being drivably connectable to the engine for propelling the combine over the ground and a rearward unit trailing the forward unit and supported on a pair of wheels and means for pivotally connecting and pivoting the forward unit relative to the rearward unit for steering the combine.

20. The combine harvester of claim 19 wherein the forward unit includes a grain cleaning mechanism for delivering clean grain, disposed in a receiving relationship with the feederhouse and the rearward unit includes a grain tank and further including means for tranferring clean grain from the cleaning mechanism of the forward unit to the grain tank of the rear unit.

21. The combine harvester of claim 18 wherein the grain tank occupies an upper portion of the body and the engine is disposed immediately rearward of the tank.

22. A crop processing header for mounting on the body of a combine harvester for gathering crop material from a field and delivering processed crop material to the body comprising:

a forward transversely extending gatherer portion, a rearwardly and upwardly extending feederhouse and a transversely extending axial flow rotary separator interposed and rigidly connected between them, wherein the gatherer portion includes a transversely extending auger conveyor for receiving gathered crop material and a cooperating conveyor floor and rear wall, said wall having a rearwardly directed opening intermediate the opposite ends of the gatherer, the auger, conveyor floor and wall cooperating to converge crop material towards and discharge it rearwardly through the rearward opening of the gatherer wall;

the separator includes an elongated generally cylindrical casing substantially contiguous with the rear wall of the gatherer and having opposite downstream ends and an inlet opening intermediate the ends and closely adjacent and registering with the discharge opening in the gatherer wall, and at least one foraminous portion in the casing wall intermediate between each downstream end and the inlet, and a casing outlet adjacent each downstream end of the casing, and an elongated rotor assembly surrounded by the casing so as to define an annular space between the casing and rotor and including a pair of opposite coaxial rotor portions, each portion having an upstream and a downstream end, the respective upstream ends substantially abutting within the lateral span of the inlet opening and each rotor upstream end carrying crop engaging elements for deflecting in a downstream direction crop material passing rearwards through the inlet opening, and including means effective in the annular space for deflecting crop material downstream so that, as the rotor rotates, it cooperates with the to propel and process crop material received through the inlet opening in a pair of opposite generally spiral paths, diverging from the inlet opening, so that a first portion of the crop material passes outwards through the foraminous casing portions and a second portion continues downstream to the outlets; and the feederhouse includes an outlet end pivotally connected to and in crop material delivery relationship with the combine body and an opposite inlet end and a feeder conveyor extending within the feederhouse from the inlet to the outlet end; and means beneath the separator and rearward of the gatherer auger conveyor floor for collecting and converging the first portion of the crop material towards a point intermediate the ends of the separator casing and discharging it upwardly and rearwardly for reception by the feederhouse conveyor for transfer to the body of the combine.

23. In a combine harvester having a mobile body, a front-mounted gatherer unit for removing crop material from a field and concentrating and converging the material for delivery of at least a portion of the material to the body of the harvester and including an elongated, laterally extending conveyor for conveying gathered material laterally and discharging it rearwardly through a gatherer outlet, and rearwardly disposed coupling frame means for connecting the gatherer unit to the mobile body, said frame means substantially embracing an aperture through which crop material is passed rearwardly for transfer to the body characterized in that:

a crop processing unit is interposed between the lateral conveyor and the coupling frame means, the unit having an inlet substantially coinciding with the gatherer outlet for receiving crop material discharged rearwardly by the lateral conveyor, and means for processing that received material and discharging a first portion through the aperture of the coupling frame means and including an outlet laterally spaced from the coupling frame for discharging a second portion of the crop material, said crop processing unit comprising an axial flow rotary separator having an axis parallel to the lateral conveyor and including a rotor having a receiving portion in a direct receiving relationship with the processing unit inlet for receiving material discharged rearwardly by the gatherer conveyor and wherein the axial direction of flow of crop material in the separator portion is generally opposite to the direction of flow in the adjacent conveyor portion and the separator rotor receiving portion includes means for dividing the received crop material into first and second components and propelling the respective components in axially opposite directions.

* * * * *

UNITED STATES PATENT AND TRADEMARK OFFICE
CERTIFICATE OF CORRECTION

PATENT NO.  : 4,663,921

DATED       : 12 May 1987

INVENTOR(S) : Gerald F. Hagstrom et al

It is certified that error appears in the above-identified patent and that said Letters Patent is hereby corrected as shown below:

```
Column 12, line 50, delete "pivotaly" and insert --pivotally--.
Column 15, line 42, after "the" insert --casing--.
Column 16, line 2, delete "connected to and" and insert
--connectible--; same line, after "in" insert --a--; lines
2-3, after "relationship" insert --,--.
```

Signed and Sealed this

Twenty-third Day of February, 1988

Attest:

DONALD J. QUIGG

*Attesting Officer*  *Commissioner of Patents and Trademarks*